United States Patent [19]

Hara et al.

[11] Patent Number: 5,277,865
[45] Date of Patent: Jan. 11, 1994

[54] GAS-ASSISTED INJECTION MOLDING PROCESS FOR PRODUCING HOLLOW MOLDED ARTICLE

[75] Inventors: Takahisa Hara, Kawanishi; Masahito Matsumoto, Ibaraki; Hiromu Fujita, Ashiya; Yuji Kamiji, Yokkaichi; Hiromasa Nakatsuka, Mie, all of Japan

[73] Assignees: Sumitomo Chemical Company, Limited, Osaka; Nissen Chemitec Corporation, Ehime, both of Japan

[21] Appl. No.: 832,325

[22] Filed: Feb. 7, 1992

[30] Foreign Application Priority Data

Feb. 8, 1991 [JP] Japan ................................. 3-017494

[51] Int. Cl.⁵ ....................... B29C 43/14; B29C 43/18
[52] U.S. Cl. .................................... 264/516; 264/513; 264/572; 425/112; 425/127; 425/128; 425/130
[58] Field of Search ............... 264/513, 572, 319, 321, 264/516, 259, 266, 328.1; 425/112, 127, 128, 130

[56] References Cited

U.S. PATENT DOCUMENTS

| | | | |
|---|---|---|---|
| 4,101,617 | 7/1978 | Friederich | 264/155 |
| 4,824,732 | 4/1989 | Hendry et al. | |
| 4,968,474 | 11/1990 | Ito | 264/572 |

FOREIGN PATENT DOCUMENTS

| | | |
|---|---|---|
| 0320925 | 6/1989 | European Pat. Off. . |
| 0322285 | 6/1989 | European Pat. Off. . |
| 333198 | 9/1989 | European Pat. Off. . |
| 2256021 | 12/1974 | France . |
| 54-034378 | 3/1979 | Japan ................................. 264/572 |
| 60-31929 | 2/1985 | Japan . |
| 61-22917 | 1/1986 | Japan . |
| 1-168425 | 7/1989 | Japan ................................. 264/572 |
| 3-009820 | 1/1991 | Japan ................................. 264/572 |
| 3-133618 | 6/1991 | Japan . |

Primary Examiner—Jan H. Silbaugh
Assistant Examiner—Catherine Timm
Attorney, Agent, or Firm—Birch, Stewart, Kolasch & Birch

[57] ABSTRACT

A hollow molded article is produced by supplying a molten resin between a pair of a fixed mold and a movable mold before the fixed mold and the movable mold are closed, inserting at least one gas-supplying pin which is provided on a surface of the fixed mold to form a hollow part in a part of the resin and supplying pressurized gas through said gas-supplying pin before the mold closing is finished, closing the movable mold to fill the resin in a cavity formed by the molds, slightly opening the molds while pressurizing a gas in the resin to expand the hollow part and opening the movable mold to remove a hollow molded article from the molds.

19 Claims, 3 Drawing Sheets

GAS-ASSISTED INJECTION MOLDING PROCESS FOR PRODUCING HOLLOW MOLDED ARTICLE

BACKGROUND OF THE INVENTION

1. Field of the Invention

The present invention relates to a method for producing a hollow molded article, preferably a multilayer hollow molded article, which is widely used as a back and a seat of a chair, a cold box and the like.

2. Description of the Related Art

A widely used method for producing a hollow resin article is a blow molding method which includes pressurizing air in a parison in a molten state contained in a female mold to expand the parison in conformity with a shape of an inner wall of a mold cavity. Though this method is advantageous in the absence of a male mold, it is impossible to form a non-uniform wall thickness of the parison. Then, this method is suitable for the production of an article having a symmetric cross section such as a bottle, but not for a profile article having an incomplete symmetric cross section. In addition, the molded article has a flaw, namely a parting line at a part corresponding to a parting plane of the female mold and sometimes burrs are formed at the flaw.

To produce a profile article such as a back of a chair, hollow molding has been developed by modifying injection molding.

For example, in one method, a high pressure gas is pressurized in a molten state resin through a hole bored in a wall of a mold to form a gas passage, namely a hollow part in the resin. However, this method has various disadvantages that a large pressurizing mark having a size of about 3 mm is formed in the produced article, that color irregularity appears between a surface of a gas penetrated part and a surface of a gas non-penetrated part, that since the gas passage is deviated, the hollow part is also deviated in the article, that is, a wall thickness of the article becomes uneven, that a diameter of the hollow part is not uniform, that a resin bank is formed in the article, and that if the injection pressure is too high, bubbles are formed in the wall of the article.

There is a method in which a high pressure gas is pressurized in a molten resin which is supplied from a cylinder nozzle through a gas-injection inlet provided in the nozzle. Since only a position for gas injection is different from the above method, this method has substantially the same disadvantages.

SUMMARY OF THE INVENTION

One object of the present invention is to provide a method for producing a hollow molded article which is suitable for the production of an asymmetric or incompletely symmetric resin article such as a back and a seat of a chair or a cold box.

Another object of the present invention is to provide a method for producing a hollow molded article which is free of large pressurizing mark, free of color irregularity, free of any deviation of the hollow part or nonuniform diameter of the hollow part, free of a resin bank, free of bubbles in the wall of the article.

According to the present invention, there is provided a method for producing a hollow molded article comprising steps of:

supplying a molten resin between a pair of a fixed mold and a movable mold before said fixed mold and said movable mold are closed, inserting at least one gas-supplying pin which is provided on a surface of said fixed mold into said molten resin to form a hollow part in a part of said resin and supplying pressurized gas through said gas-supplying pin before the mold closing is finished, closing said movable mold to fill the resin in a cavity formed by said molds, slightly opening said molds while a pressurized gas is injected in said resin to expand said hollow part, and opening said movable mold to remove a hollow molded article from said molds.

In one of preferred embodiments, the method of the present invention comprises steps of:

placing a skin material between said fixed mold and said movable mold when they are open, moving said movable mold towards said fixed mold and supplying a molten resin between said skin material and said fixed mold before the completion of mold closing, closing said movable mold to fill the resin in a cavity formed by said molds, inserting at least one gas-supplying pin which is provided on a surface of said fixed mold in said molten resin to form a hollow part in a part of said resin and supplying pressurized gas through said gas-supplying pin before the mold closing is finished, slightly opening said molds while a pressurized gas is injected in said resin to expand said hollow part, and opening said movable mold to remove a hollow molded article from said molds.

DETAILED DESCRIPTION OF PREFERRED EMBODIMENTS

Now, a molding machine used in the method of the present invention will be explained by making reference to the accompanying drawings.

Similar to a conventional press molding machine, a molding machine used in the method of the present invention includes a fixed frame and a movable frame, a fixed mold and a movable mold attached to respective frames, and an injection machine connected to the fixed mold. In addition, in the present invention, the molding machine further includes a gas passage provided in the fixed mold, a high pressure source and a gas-supplying pin provided at a front end of the gas passage.

Figure 1:
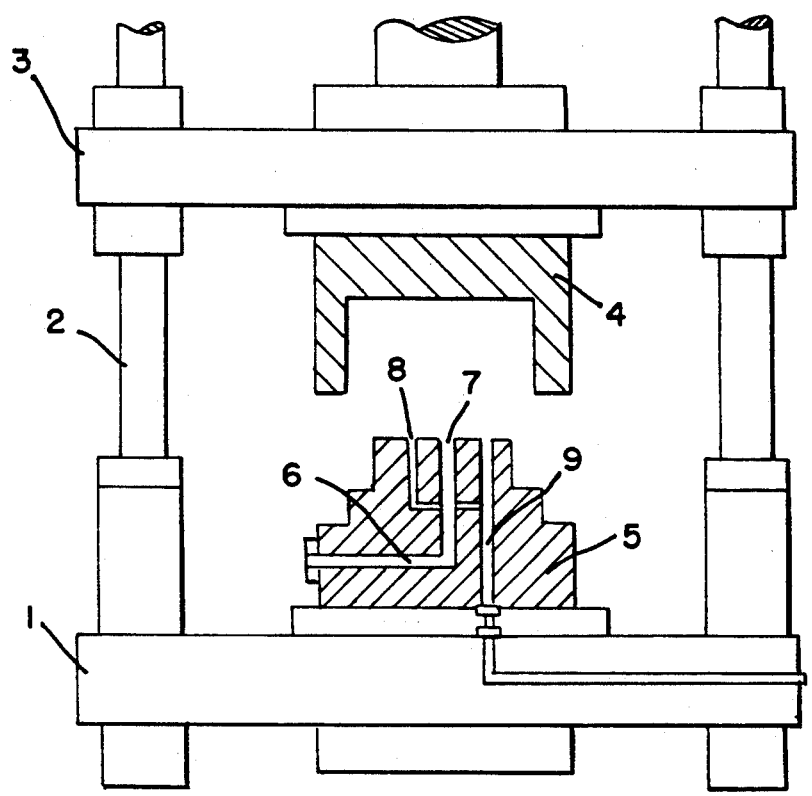
FIG. 1 is a cross section of an example of a molding machine to be used in the present invention.

In the molding machine schematically shown in FIG. 1 in which conventional means such as a heating and cooling means for the molds are not shown for simplicity, a fixed frame 1 is connected with a movable frame 3 through a connecting rod 2, and a movable mold 4 and a fixed mold 5 are attached to the movable frame 3 and the fixed frame 1, respectively.

The fixed mold 5 has a resin conduit 6 and a gas passage 9 therein. A front end of the conduit 6 communicates with a gate 7 on a side facing the movable mold 4, and front ends of the passage 9 communicate with gas-supplying pins 8 (see FIG. 2). A rear end of the resin conduit 6 is connected to an injection machine, and that of the gas-supplying passage 9 is connected with a gas source which includes a compressor, a pressure accumulator and a valve.

Figure 2A:
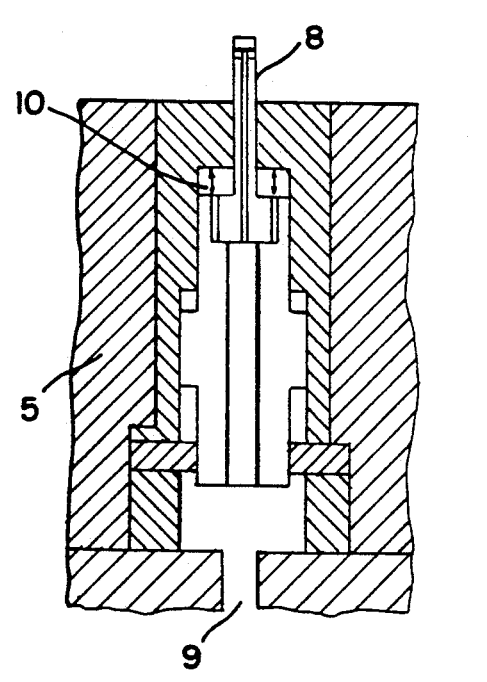
FIG. 2 is an enlarged cross section of a gas-supplying pin section of the molding machine of FIG. 1.
Figure 2B:
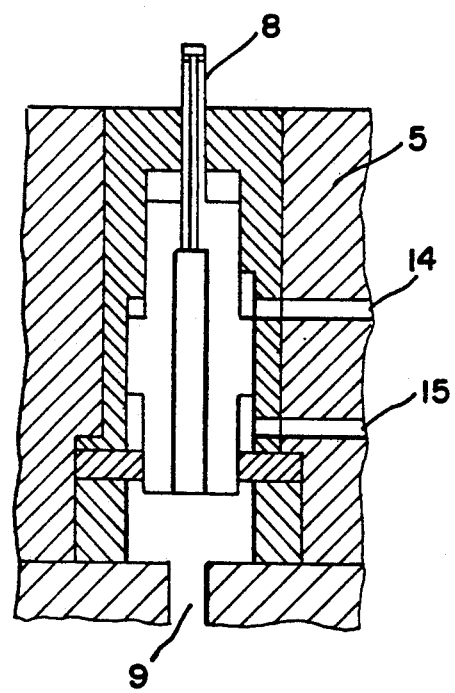

The gas-supplying pin 8 is, for example, provided in the fixed mold 5 as shown in FIG. 2 and moved in and out by springs 10 and a gas pressure in the gas passage. The gas passage 9 passes through an axial direction of the gas-supplying pin 8. This type of the gas-supplying pin is just one example. The pin should have only a function to pierce its tip end into the molten resin when the molds are closed. A force for piercing may be generated by a spring force against compression, a fluid pressure such as a gas pressure or a hydraulic pressure. The numerals 14 and 15 refer to an inlet and an outlet for gas pressure or hydraulic pressure, respectively.

The structure of the mold to be used in the method of the present invention may be substantially the same as that of the mold for compression molding. Since the gas is forcedly supplied, gas freeing should be taken into consideration. To this end, an end face of the mold is formed in a shear edge form to provide a narrow clearance between the fixed mold and the movable mold.

As the resin to be molded, any conventionally used synthetic resin can be used. Specific examples of the resin are general resins such as polyethylene, polypropylene, ABS, polystyrene and polyvinyl chloride; and engineering resins such as polycarbonate, polyacetal and modified polyphenylene ether. The resin may contain a conventional filler such as an inorganic filler or glass fibers, a pigment, a lubricant, or an antistatic agent.

As the skin material which is optionally used in the present invention, woven fabric, nonwoven fabric, a net of metal, fiber or a thermoplastic resin, paper, a metal foil, and a sheet or film of a thermoplastic resin or a thermoplastic elastomer are used. The skin material may be decorated by embossing, printing, coloring or dyeing. In addition, it is possible to use a skin material made of a thermoplastic resin foam such as polyolefin, polyvinyl chloride and polystyrene; a thermosetting resin foam such as polyurethane; or a rubber foam of, for example, poly(cis-1,4-butadiene) or an ethylene-propylene copolymer. Two or more skin materials may be used in a laminate form. When the skin material is used, at least a part of the skin material may be preheated before supply to adjust its tensile stress and elongation.

An outline of the molding method is illustrated in FIG. 3. FIG. 3 shows the molding steps using no skin material. The molding steps are substantially the same when the skin material is used.

Figure 3A:
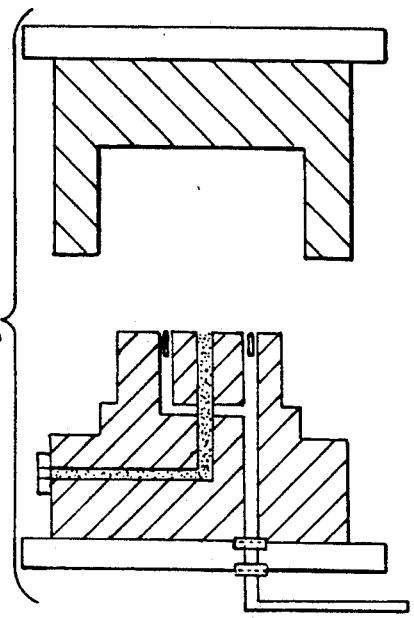
FIGS. 3A to 3D show cross sections of the molding machine in various steps of the molding method of the present invention.

The molding steps are as follows:

(A) The movable mold 4 is opened (FIG. 3A).

Figure 3B:
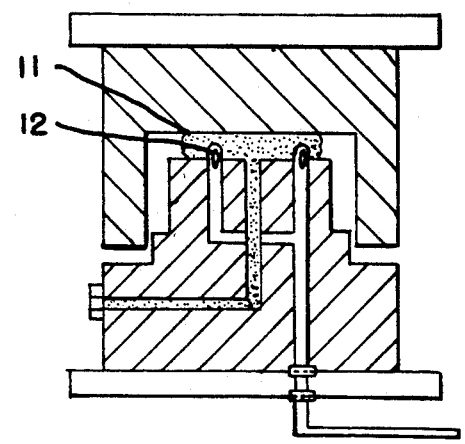

(B) The movable mold 4 is moved towards the fixed mold 5. When a suitable cavity clearance is reached, the screw is forwarded, and the molten resin 11 is supplied in the cavity through the resin conduit 6 (FIG. 3B).

Figure 3C:
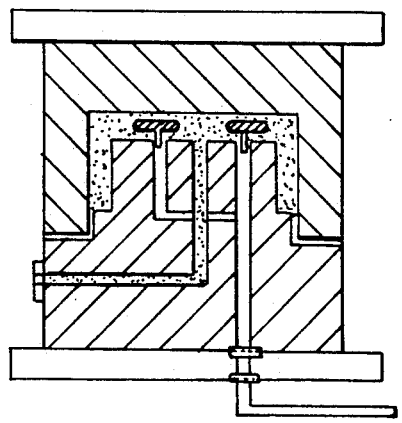

(C) The movable mold 4 is fully closed to press the molten resin 11 between the molds 4 and 5 to fill the cavity with the resin (FIG. 3C). Before the mold closing is completed, the gas supplying pin(s) are inserted in the molten resin and pressurized gas is supplied in the molten resin through the gas-supplying pin(s).

Figure 4:
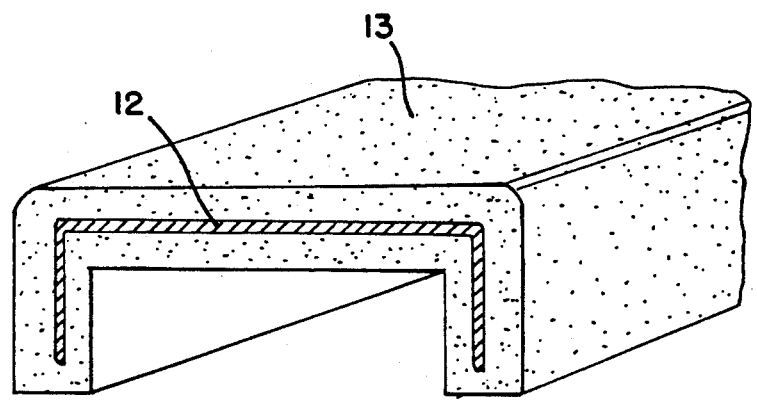
FIG. 4 is a partly cut-away perspective view of a hollow molded article produced by the method of the present invention.
Figure 3D:
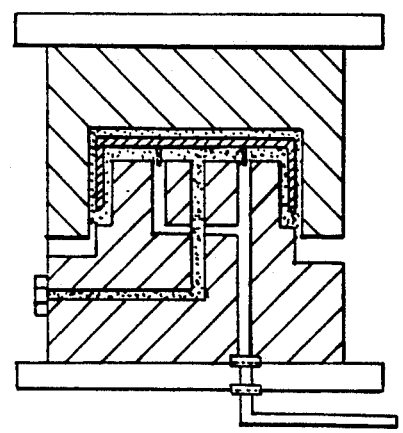

(D) Then, the gas (e.g. air, carbon dioxide, nitrogen, fluorocarbons, etc.) is pressurized in the hollow part 12 while opening the molds slightly. An amount of this slightly opening of the molds corresponds to an intended hollow volume of the article. Under such a slightly opened state of the molds, the hollow molded article is solidified by cooling the molds with a cooling medium (FIG. 3D). Thereafter, the molds are fully opened and the molded article 13 (see FIG. 4) is released.

The method of the present invention is suitable for producing an article having an asymmetric or incompletely symmetric shape such as a seat, a back, a side panel or a dashboard used in a car, a train or a boat or ship and a cold box, in particular, a multilayer hollow molded article having an ornamental material or other functional material on its surface.

In the method of the present invention, the gas is supplied through a thin gas-supplying nozzle. Therefore, the pressurizing mark is small. In addition, since the supply of the gas decreases the temperature and pressure of the molten resin and smoothes the flow of the resin, even when a resin having poor flow is used or a flat or asymmetric article is to be produced, it is possible to produce a light-weight large-size hollow molded article which does not have defects such as burning with gas, unevenness of the diameter of the hollow part or deviation of wall thickness, color irregularity between the surface of the gas penetrated part and the surface of the gas non-penetrated part, inclusion of the gas, bubbles and the like.

In the preferred embodiment of the method of the present invention, the multilayer hollow molded article having the skin material with various functions is mass produced, and the skin material is free of damage for the above reasons so that the produced article has good ornamental effect.

EXAMPLE 1

Using the same molding machine as shown in FIG. 1, a polypropylene ribbed panel (8 cm × 60 cm, a thickness of 6 mm) was molded under the following conditions:

| Conditions | |
| --- | --- |
| Mold closing pressure: | 50 kg/cm$^2$ |
| Mold temperature: | 80° C. |
| Molten resin temperature: | 230° C. |
| Inert gas pressure: | 30 kg/cm$^2$ |
| Amount of slight mold opening: | 3 mm |

By the formation of the hollow part in the article, weight of the molded article was reduced by about 30% in comparison to a solid molded article and a molding cycle was shortened by about 20%. Further, stiffness, heat insulation and sound absorption of the article were greatly increased.

EXAMPLE 2

Using the same molding machine as used in Example 1, a polypropylene seat back (50 cm × 50 cm, a height of 60 mm) laminated with a skin material consisting of a polyvinyl chloride sheet lined by a polypropylene foam sheet (an average thickness of the foam sheet: 3 mm, an expansion ratio: 20 times) was molded under the following conditions:

| Conditions | |
| --- | --- |
| Mold closing pressure: | 40 kg/cm$^2$ |
| Mold temperature: | 50° C. |
| Molten resin temperature: | 200° C. |
| Inert gas pressure: | 50 kg/cm$^2$ |

-continued

| Conditions | |
|---|---|
| Amount of slight mold opening: | 10 mm |

By the formation of the hollow part in the article, softness, stiffness, heat insulation and sound absorption of the article were greatly increased.

What is claimed is:

1. A method for producing a hollow molded article comprising steps of:
    supplying a molten resin between a pair of a fixed mold and a movable mold before said fixed mold and said movable mold are closed;
    inserting at least one gas-supplying pin which is provided on a surface of said fixed mold into said molten resin to form a hollow part within said resin;
    supplying pressurized gas through said gas-supplying pin before said molds are closed;
    closing said movable mold to fill the resin in a cavity formed by said molds;
    slightly opening said molds while supplying additional pressurized gas in said resin to expand said hollow part; and
    opening said movable mold to remove the hollow molded article from between said molds.

2. A method for producing a hollow molded article having a laminated skin material comprising steps of:
    placing a skin material between a fixed mold and a movable mold when said molds are open;
    moving said movable mold to close it towards said fixed mold;
    supplying a molten resin between said skin material and said fixed mold before the molds are closed;
    closing said movable mold to fill the resin in a cavity formed by said molds;
    inserting at least one gas-supplying pin which is provided on a surface of said fixed mold into said molten resin to form a hollow part within said resin;
    supplying pressurized gas through said gas-supplying pin before said molds are closed;
    slightly opening said molds while supplying additional pressurized gas in said resin to expand said hollow part; and
    opening said movable mold to remove the hollow molded article from between said molds.

3. The method according to claim 1, wherein said resin is selected from the group consisting of polyethylene, polypropylene, ABS, polystyrene, polyvinyl chloride, polycarbonate, polyacetal and modified polyphenylene ether.

4. The method according to claim 3, wherein said resin further includes an additive selected from the group consisting of filler, a pigment, a lubricant, and an antistatic agent.

5. The method according to claim 1, wherein said molds are closed at a pressure of 50 kg/cm$^2$.

6. The method according to claim 1, wherein said molds are at a temperature of 80° C.

7. The method according to claim 1, wherein said molten resin is at a temperature of 230° C.

8. The method according to claim 1, wherein said pressurized gas is supplied at a pressure of 30 kg/cm$^2$.

9. The method according to claim 1, wherein said molds are slightly opened to a distance of 3 mm apart.

10. The method according to claim 2, wherein said resin is selected from the group consisting of polyethylene, polypropylene, ABS, polystyrene, polyvinyl chloride, polycarbonate, polyacetal and modified polyphenylene ether.

11. The method according to claim 10, wherein said resin further includes an additive selected from the group consisting of a filler, a pigment, a lubricant, and an antistatic agent.

12. The method according to claim 2, wherein said skin material is selected from the group consisting of woven fabric, nonwoven fabric, a net of metal, a net of thermoplastic resin, paper, a metal foil, a sheet or film of a thermoplastic resin, a sheet or film of thermoplastic elastomer, a thermoplastic resin foam, a thermosetting resin foam and a rubber foam.

13. The method according to claim 2, wherein at least two skin materials are used together in a laminated form.

14. The method according to claim 2, wherein said molds are closed at a pressure of 40 kg/cm$^2$.

15. The method according to claim 2, wherein said molds are at a temperature of 50° C.

16. The method according to claim 2, wherein said molten resin is at a temperature of 200° C.

17. The method according to claim 2, wherein said pressurized gas is supplied at a pressure of 50 kg/cm$^2$.

18. The method according to claim 2, wherein said molds are slightly opened to a distance of 10 mm apart.

19. The method according to claim 2, wherein said skin material is a net of fiber.

* * * * *